(12) United States Patent
Buchanan

(10) Patent No.: US 7,931,803 B2
(45) Date of Patent: Apr. 26, 2011

(54) FLUID FILTER

(76) Inventor: Andrea Elaine Buchanan, Verwood (GB)

( * ) Notice: Subject to any disclaimer, the term of this patent is extended or adjusted under 35 U.S.C. 154(b) by 751 days.

(21) Appl. No.: 11/662,037

(22) PCT Filed: Sep. 6, 2005

(86) PCT No.: PCT/GB2005/003436
§ 371 (c)(1),
(2), (4) Date: Nov. 8, 2007

(87) PCT Pub. No.: WO2006/027572
PCT Pub. Date: Mar. 16, 2006

(65) Prior Publication Data
US 2008/0087592 A1 Apr. 17, 2008

(30) Foreign Application Priority Data
Sep. 6, 2004 (GB) .................................. 0419686.1

(51) Int. Cl.
B01D 29/05 (2006.01)
B01D 29/70 (2006.01)
B01D 33/52 (2006.01)
B01D 35/16 (2006.01)

(52) U.S. Cl. ........ 210/206; 210/209; 210/296; 210/313; 210/315; 210/340; 210/411; 210/412

(58) Field of Classification Search .................. 210/411, 210/206, 209, 313, 296, 315, 340, 412
See application file for complete search history.

(56) References Cited

U.S. PATENT DOCUMENTS

| 1,971,090 | A | * | 8/1934 | Tyler et al. | 210/391 |
| 2,083,148 | A | | 6/1937 | Coulombe | |
| 2,672,986 | A | | 3/1954 | Lichtgarn | |
| 2,954,872 | A | * | 10/1960 | Liddell | 210/798 |
| 3,056,499 | A | * | 10/1962 | Liddell | 210/108 |
| 3,541,004 | A | * | 11/1970 | Cooper et al. | 210/636 |
| 3,998,735 | A | * | 12/1976 | Nathan | 210/779 |
| 4,075,098 | A | * | 2/1978 | Paul et al. | 210/167.02 |
| 4,271,019 | A | * | 6/1981 | Galletti | 210/108 |
| 4,315,820 | A | * | 2/1982 | Mann et al. | 210/408 |
| 4,804,481 | A | | 2/1989 | Lennartz | |
| 5,008,009 | A | | 4/1991 | Ciaffoni | |
| 5,500,093 | A | * | 3/1996 | Marsden | 196/46 |
| 5,882,512 | A | * | 3/1999 | Denkewicz et al. | 210/167.11 |
| 6,033,558 | A | * | 3/2000 | Yokota | 210/108 |
| 2002/0038783 | A1 | | 4/2002 | Trotzki et al. | |
| 2008/0087592 | A1 | * | 4/2008 | Buchanan | 210/206 |

FOREIGN PATENT DOCUMENTS
WO WO 2006027572 A2 3/2006
* cited by examiner

Primary Examiner — Thomas M Lithgow
(74) Attorney, Agent, or Firm — Michael Best & Friedrich LLP

(57) ABSTRACT

A fluid filter (1) comprises a housing (3) provided with a fluid inlet (11) and a fluid outlet (19), filter means (45) being mounted in the house (3) between the fluid inlet (11) and the fluid outlet (19) to filter fluid flowing through the housing (3). Actuation means (43) is provided to move the filter means (45), in use, within the housing (3) to dislodge particles of filtered material from the filter means (45) so as to clean the filter means (45). A filter assembly comprising a plurality of such filters is also provided.

32 Claims, 5 Drawing Sheets

FLUID FILTER

CROSS-REFERENCE TO RELATED APPLICATIONS

This patent application is a national stage filing under 35 U.S.C. 371 of International Application No. PCT/GB2005/003436, filed 6 Sep. 2005, which claims foreign priority to Great Britain Patent Application No. GB 0419686.1, filed 6 Sep. 2004, the disclosures of which are incorporated by reference herein in their entireties. Priority to each application is hereby claimed.

The present invention relates to a fluid filter.

A fluid filter typically comprises a fluid inlet and a fluid outlet between which is provided a filter element which may comprise a mesh filter element for example. The pores in the mesh are sized to allow fluid flow through the pores, but to trap particles of undesirable material carried by the fluid.

The pores can become blocked with trapped particles over time and to avoid the costs and inconvenience of replacing the filter element, it has been proposed to clean the filter element in situ.

It has been proposed to clean the filter element by scraping or brushing the filter element but this does not always clean the filter pores properly.

A back flushing process has been proposed wherein, during a cleaning cycle, the flow of fluid through the filter is reversed so that the filtered fluid in the downstream part of the filter is pumped back through the filter element to try to dislodge the particles from the upstream side of the filter pores. However this reversal of fluid flow is typically required to last for at least twenty five seconds during which time normal use of the filter, and therefore of the fluid being filtered, is interrupted. Such back flushing also typically requires a fluid pressure above that which can often be achieved.

Furthermore, the back flushing process can suffer from so called rat-holing wherein the particles from only some of the filter pores are cleared, resulting in all of the fluid flowing through those cleared pores rather than cleaning the remaining blocked filter pores.

According to a first aspect of the invention there is provided a fluid filter comprising a housing provided with a fluid inlet and a fluid outlet, filter means being mounted in the housing between the fluid inlet and the fluid outlet to filter fluid flowing through the housing, actuation means being provided to move the filter means, in use, within the housing to dislodge particles of filtered material from the filter means so as to clean the filter means.

Preferably the movement of the filter means comprises an axial movement in one direction and then in an opposed direction.

The movement in at least one direction is an abrupt movement that moves the filter means relatively quickly over a relatively short distance to jolt the filtered particles from the blocked pores of the filter means.

Preferably the filter means is moved initially towards the filter outlet. However, the filter means may be moved initially towards the filter inlet, the filter means being biased back towards the filter outlet to clean the filter means. Either way, the filter means is moved into the filtered fluid which acts on the particles blocking the pores of the filter means to dislodge those particles that have not already been dislodged by the abrupt movement.

Preferably the actuation means exerts a pulse of force on the filter means to move the filter means. Preferably the pulse duration is less than five seconds. Most preferably the pulse duration is less than one second.

Preferably the pulse is such that the filter means moves an axial distance of less than 10 mm. However, the pulse could move the filter means more or less than 10 mm if required.

Preferably the actuation means comprises an electrically operated actuator. Most preferably the actuator comprises a solenoid. The actuator could comprise a motorised cam, rotation of the cam moving the filter means.

Alternatively the actuation means comprises a manually operated mechanical actuator. The actuation means could comprise a crank operated cam for example, rotation of the cam moving the filter means.

Preferably the filter means is biased to a rest position, the actuation means, in use, moving the filter means away from the rest position against the action of the bias.

Preferably a drain aperture and plug means are provided on the upstream side of the filter, that is on the upstream side of the filter means during normal use of the filter, the filter being such that the plug means is moved away from the drain aperture when the filter means is moved.

The filter is thus operative such that as fluid enters the upstream part of the fluid filter through the fluid inlet, the filter means is moved to dislodge filtered material from the filter means into the upstream part of the fluid filter, further incoming fluid from the fluid inlet forcing the dislodged filtered material out of the upstream part of the fluid filter and through the open drain aperture.

Preferably the actuation means is operative to simultaneously move the filter means and the plug means.

Preferably the filter means comprises a planar filter disc plate.

Preferably the filter disc is provided with peripheral sealing means which form a fluid seal between the interior of the housing and the periphery of the filter means.

Preferably reinforcing means are provided to reinforce the filter disc to resist deformation of the filter disc in use.

Preferably the reinforcing means comprises at least one reinforcing brace mounted across at least part of the filter disc.

Preferably the filter means is mounted on a shaft which extends from the actuation means into the housing. The filter means and shaft thus respectively comprise a piston and piston rod within the filter housing.

Preferably the filter inlet comprises a radially directed inlet provided in the side wall of the housing. The filter inlet may alternatively comprise an axially directed inlet provided in the base of the housing.

Preferably the filter outlet comprises a radially directed outlet provided in the side wall of the housing. The filter outlet may alternatively comprise an axially directed outlet provided in the top of the housing.

Preferably the filter further comprises means to release anti corrosive material into the filtered fluid.

Preferably the means to release anti corrosive material comprises a source of anti corrosive material mounted in the outlet path of the filtered fluid.

Preferably the means to release anti corrosive material comprises a plate of an anti corrosive metal material arranged such that the filtered fluid contacts the plate prior to flowing through the fluid outlet.

Preferably impeller means is provided to direct the filtered fluid into contact with the anti corrosive means.

Preferably means are provided to remove oxidisation formed on the anti corrosive means.

Preferably the oxidisation removal means comprises abrasion means operative to contact the anti corrosive means and abrade oxidisation from the anti corrosive means.

Preferably the oxidisation removal means is mounted to the impeller means for rotation with the impeller means.

According to a second aspect of the invention there is provided a filter assembly comprising a plurality of the fluid filters of the first aspect of the invention connected together.

In one embodiment the fluid filters are connected in series such that fluid flows through one fluid filter and into an adjacent fluid filter.

Preferably each fluid filter comprises filter means adapted to filter finer material than the previous fluid filter in the filter assembly.

In another embodiment, the fluid filters are connected in parallel such that fluid simultaneously enters the fluid inlets of each filter and simultaneously exits the fluid outlets of each filter.

According to a third aspect of the invention there is provided a fluid filter comprising a housing provided with a fluid inlet and a fluid outlet, filter means being mounted in the housing between the fluid inlet and the fluid outlet to filter fluid flowing through the housing, the filter further comprising means to release anti corrosive material into the filtered fluid.

Preferably the means to release anti corrosive material comprises a source of anti corrosive material mounted in the outlet path of the filtered fluid.

Preferably the means to release anti corrosive material comprises a plate of an anti corrosive metal material arranged such that the filtered fluid contacts the plate prior to flowing through the fluid outlet.

Preferably impeller means is provided to direct the filtered fluid into contact with the anti corrosive means.

Preferably means are provided to remove oxidisation formed on the anti corrosive means.

Preferably the oxidisation removal means comprises abrasion means operative to contact the anti corrosive means and abrade oxidisation from the anti corrosive means.

Preferably the oxidisation removal means is mounted to the impeller means for rotation with the impeller means.

Other aspects of the present invention may include any combination of the features or limitations referred to herein.

The present invention may be carried into practice in various ways, but embodiments will now be described by way of example only with reference to the accompanying drawings in which.

Figure 1:
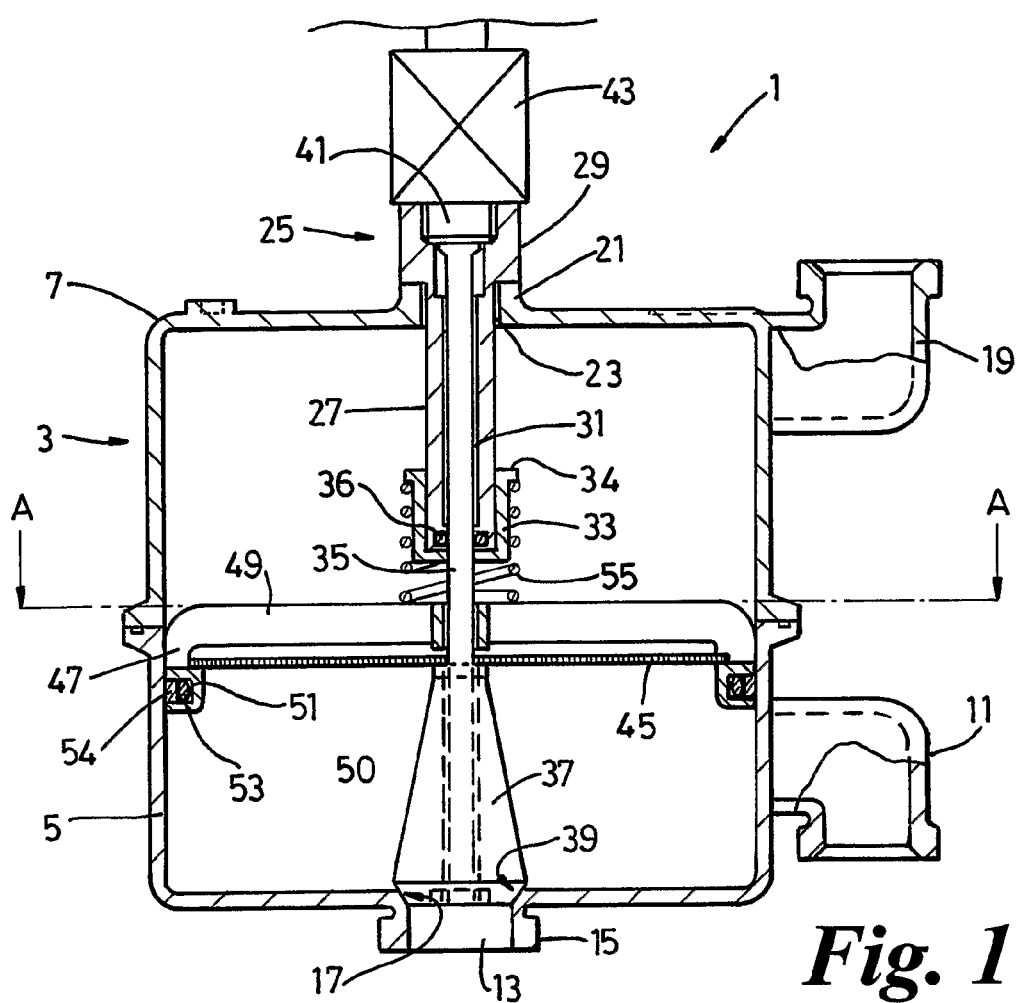
FIG. 1 is a sectional side view of a filter in accordance with the present invention showing the filter in a rest condition.
Figure 2:
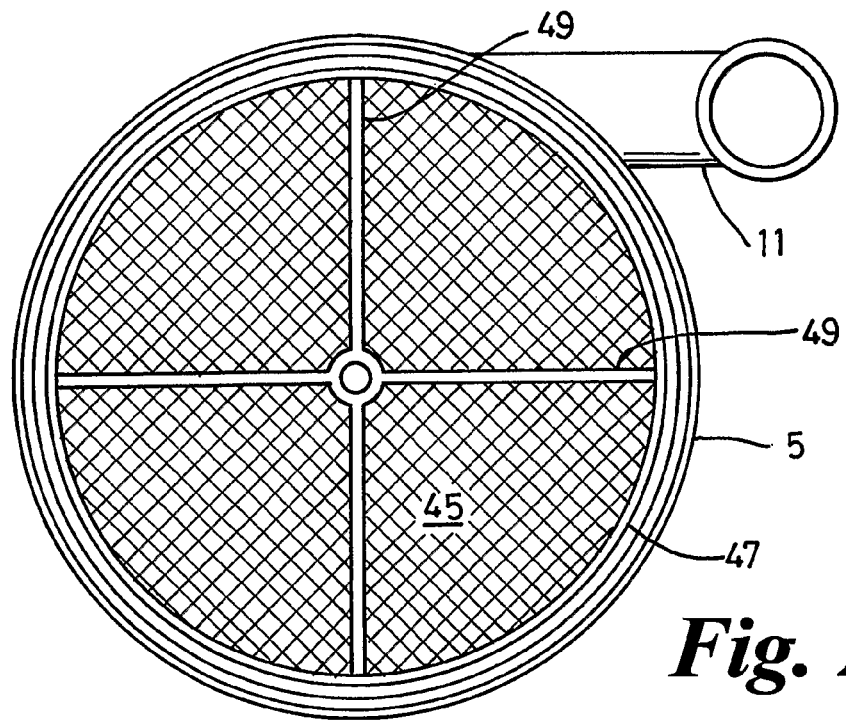
FIG. 2 is a plan view of the filter of FIG. 1 taken on line A-A of FIG. 1.
Figure 3:
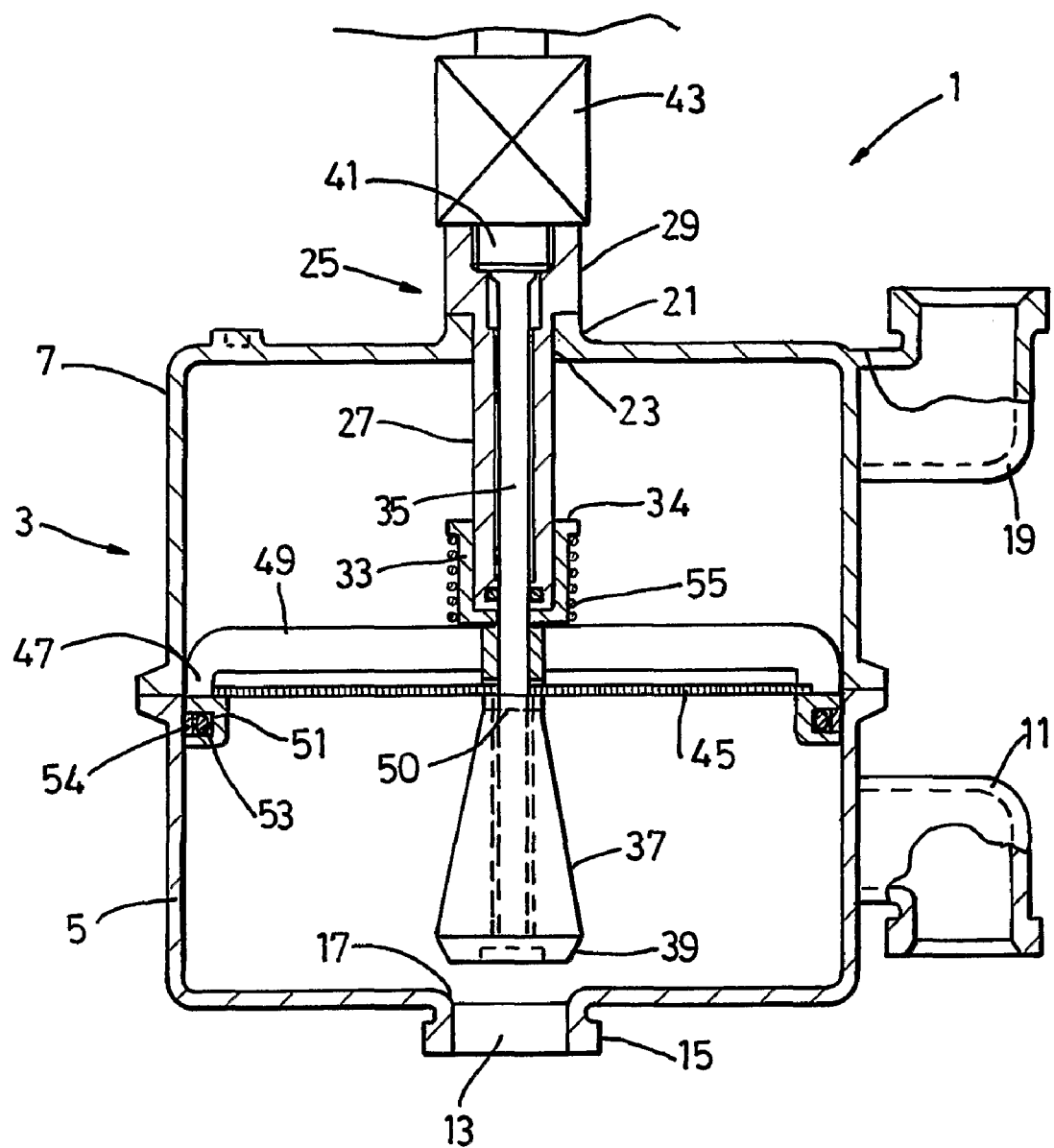
FIG. 3 is a sectional side view corresponding to FIG. 1 but showing the filter in another condition.

Referring to FIGS. 1 to 3, a fluid filter 1 comprises a hollow cylindrical housing 3 formed from two housing halves 5, 7 that are sealingly joined together using any suitable method which may include the use of a deformable gasket such as a rubber or fabric gasket. The housing halves 5, 7 could comprise peripheral, mating flanges that enable the housing halves 5, 7 to be bolted or clamped together, or the housing halves 5, 7 could comprise a peripheral, sealing snap fit type connection.

Lower housing half 5 comprises a radially directed tubular fluid inlet 11 which extends through the side wall of the lower housing half 5. Lower housing half 5 also comprises an axially aligned circular drain aperture 13 formed in a cylindrical boss 15 at the base of the lower housing half 5. The internal face of the boss 15 around the aperture 13 is chamfered 17.

Upper housing half 7 comprises a radially directed tubular fluid outlet 19 which extends through the side wall of the upper housing half 7. Upper housing half 7 also comprises an axially aligned cylindrical boss 21 formed with a short, threaded through bore 23.

An elongate guide hub 25 extends into the upper housing half 7 with the upper end of the body 27 of the hub 25 threadingly engaging the bore 23, and the underside of the head 29 of the hub 25 abutting the boss 21. The hub 25 is formed with an axial through bore 31.

An end cap 33 is secured to the lower end of the body 27 of the hub 25 and comprises a radially outwardly extending peripheral flange 34 that functions as a spring locator.

A shaft 35 extends through the bore 31 in the hub 25 such that the lower end of the shaft 35 projects through the end cap 33 and into the housing 3.

A seal 36 is provided at the lower end of the body 27 of the hub 25 which sealingly engages the shaft 35 to effect a fluid seal between the shaft 35 and the hub 25 to resist fluid leaking from the housing 3 and along the bore 31 in the body 27 of the hub 25. The seal 36 could comprise any suitable seal including, for example, an O-ring type seal. The seal may comprise an energising O-ring type seal that pushes against a primary seal to force the primary seal into sealing contact with the hub 25.

The lower end of the shaft 35 terminates in a plug 37 that flares outwardly from the shaft 35. The wider, lower end of the plug 37 is radially inwardly chamfered 39 so as to seal with the chamfered face 17 of the boss 15 of the lower housing half 5 when the chamfered faces 17, 39 are in contact.

The upper end of the shaft 35 terminates in a piston 41 which is connected to actuation means comprising, in the example illustrated, a solenoid 43 operative to move the shaft 35 axially down within the bore 31 in the hub 25 against the biasing force of a spring 55 that acts to subsequently move the shaft 35 axially upwardly.

Filter means is also connected to the shaft 35 in between the end cap 33 and the plug 37. The filter means comprises a planar filter disc 45 comprising a mesh formed with a plurality of pores. The size of the pores will be selected so as to trap the desired particles from the fluid being filtered.

The periphery of the filter disc 45 is secured to reinforcing means comprising a circular outer ring 47 and two cross braces 49 arranged in cruciform when viewed in plan, see FIG. 2. The ring 47 and cross braces 49 are operative to resist deflection and deformation of the filter disc 45 in use, and in particular when some of the pores of the filter disc 45 become blocked as blocked pores will increase the force acting on the filter disc by the fluid flowing through the filter.

The filter disc 45 and reinforcing means are secured to the shaft 35 using, for example, a bolt 50 that extends up through the plug 37 and into a threaded bore (not shown) formed in the lower end of the shaft 35.

Sealing means are provided at the periphery of the reinforcing ring 47 to effect a fluid seal between the ring 47 and the side wall of the housing 3. In the example illustrated the sealing means comprises a peripheral groove 51 formed in the ring 47. An O-ring 53 sits in the groove 51 and acts against an outer sealing strip 54 also located in the groove 51. The O-ring 53 acts to push the outer sealing strip 54 into sealing engagement with the side wall of the housing 3.

Biasing means comprising a coil spring 55 is mounted on the shaft 35, the upper end of the spring 55 abutting the flange 34 of the end cap 33, and the lower end of the spring 55 abutting the cross braces 49 on the filter means. The spring 55 acts to bias the shaft 35 axially downwardly towards the base of the lower filter housing 5 and away from the solenoid 43 such that the drain plug 37 is biased into sealing engagement with the drain aperture 13. This rest position is shown in FIG. 1.

In use, with the filter in the rest position, fluid enters the fluid inlet 11 in the lower housing 5 and swirls around the lower housing 5. The fluid cannot drain through the drain aperture 13 because the plug 37 is biased to seal the drain aperture 13 as shown in FIG. 1. The fluid fills the lower housing half 5 and passes upwardly through the pores in the filter disc 45. Any particles in the fluid that are larger than the pores get trapped by the filter disc 45, whilst filtered fluid passes through the filter disc 45 and into the upper housing half 7. The filtered fluid exits the upper housing half 7 via the tubular outlet 19.

After a period of use, sufficient particles will be filtered from the fluid that some or all of the pores of the filter disc 45 become clogged or blocked. In such a situation, fluid flow through the filter 1 may be reduced or may stop altogether.

The filter 1 reverts to a cleaning cycle at a predetermined time which may correspond, for example, to the time at which a predetermined acceptable pressure drop or fluid flow rate occurs. During the cleaning cycle the solenoid 43 is actuated to pass a rapid pulse of tensile force to the shaft 35 to move the shaft 35, the filter disc 45 and the drain plug 37 axially upwardly towards the top of the upper filter half 7 and into the filtered fluid as shown in FIG. 3. This upward movement is against the biasing force of the spring 55. The pulse is preferably less than five seconds in duration but can be any duration suitable to dislodge the particles of filtered material from the blocked or clogged pores.

During this upward movement, fluid is still entering the housing 3 through the fluid inlet 11.

The pulse of upward movement serves to dislodge particles from clogged or blocked pores in the filter disc 45, the dislodged particles dispersing into the unfiltered fluid upstream (below) the filter disc 45. The continuing input of fluid through the fluid inlet 11 forces the fluid containing the dispersed particles along the path of least resistance, that is, through the open drain aperture 13.

The actuation means, namely the solenoid 43, thus serves to dislodge trapped particles from the filter disc 45, open the drain aperture 13, flush dislodged particles from the housing 3, and close the drain aperture 13 all using only a single, low energy pulse.

On termination of the pulse of force from the solenoid 43, the spring 55 biases the shaft 35, filter disc 45 and drain plug 37 downwardly away from the top of the housing 3 and the solenoid 43 to the rest position shown in FIG. 1 wherein the drain plug 37 sealingly closes the drain aperture 13.

The fluid can enter and exit the housing 3 under pressure provided from a pump or pumps (not shown), or under mains pressure as found in a water supply. It will be appreciated that the minimum pressure required to clean the filter is relatively low and is typically below the pressure typically achieved via a pump or mains fluid supply.

The inlet 11 and outlet 19 can be radially directed as described, or can be axially directed so as to be formed in the base and top of the lower and upper housing halves 5, 7 respectively. Having a radially directed inlet and outlet generates a spiralling of fluid within the housing 3 which improves filtration and improves the flushing of dislodged particles using the cleaning cycle described above.

The filter 1 can be a discrete unit, or could comprise one of a number of filters connected together in a filter system. The filters 1 could be connected together in series or in parallel, and the tubular inlet 11 and outlet 19 of each filter 1 can be shaped so as to facilitate alignment and connection between adjacent filters 1. The inlet 11 and outlet 19 comprise tubular elbows for example.

The connected filters 1, when connected in parallel, could comprise filter discs 45 of similar porosity so as to increase the volume of fluid filtered, or the connected filters 1, when connected in series, could comprise filter discs 45 of decreasing porosity in the direction of fluid flow so as to be able to filter finer material from the fluid.

The filter 1 or filter system could comprise part of any desired fluid system such as, for example, a domestic water supply, or an industrial fluid system such as a heating or cooling system.

Figure 4:
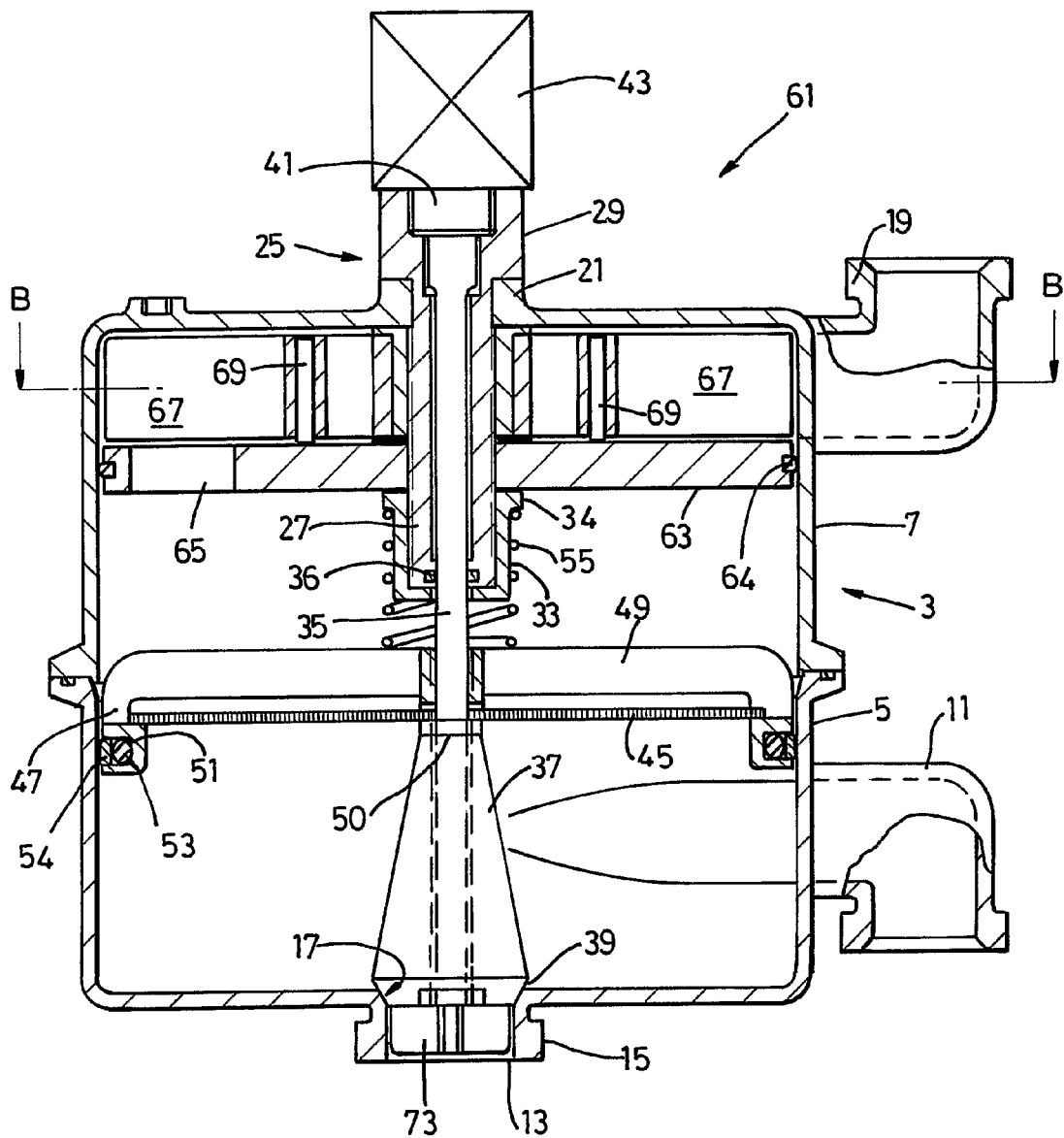
FIG. 4 is a sectional side view of a modified filter in accordance with the present invention.
Figure 5:
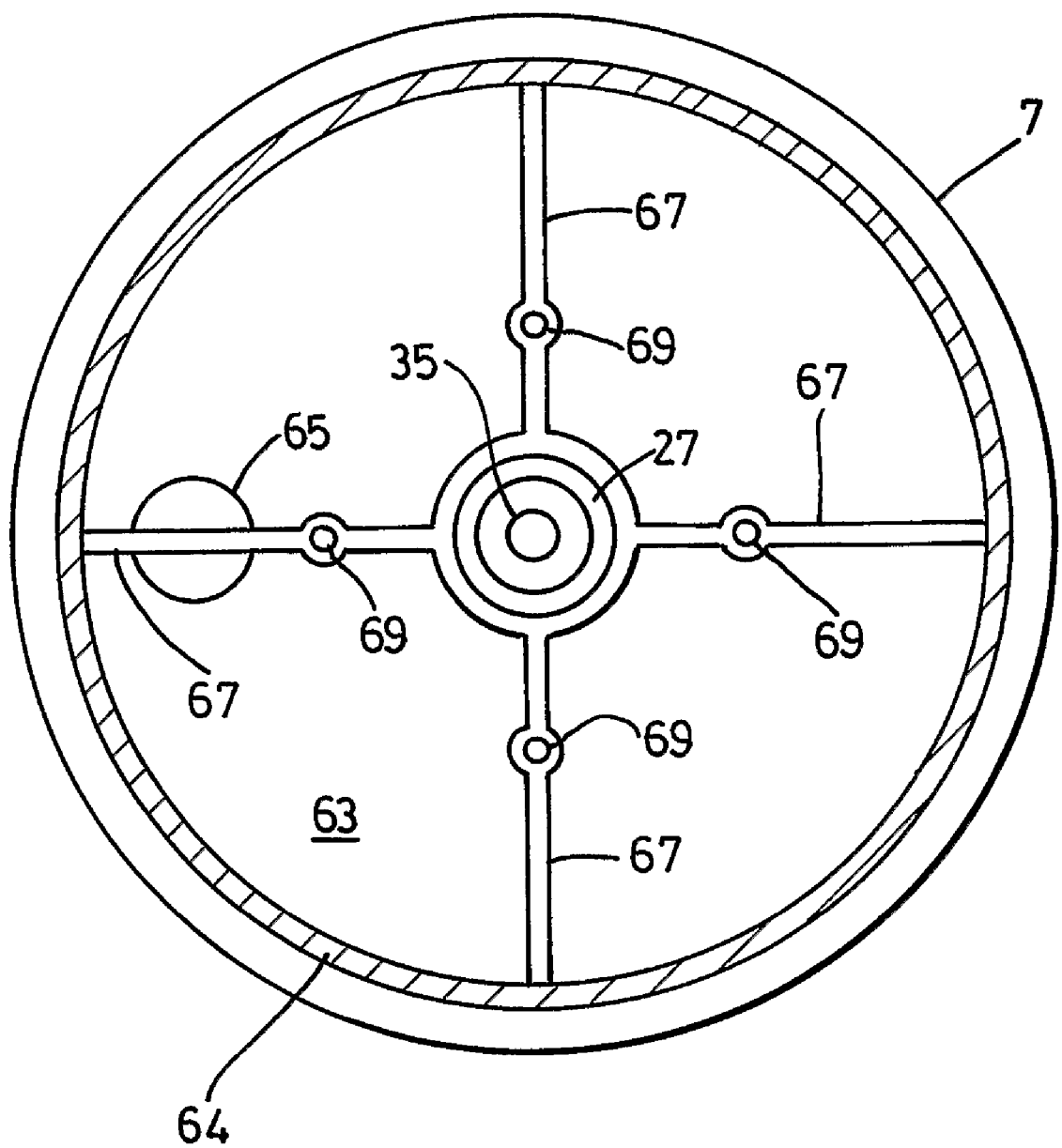
FIG. 5 is a plan view of the filter of FIG. 4, taken on line B-B of FIG. 4.
Figure 6:
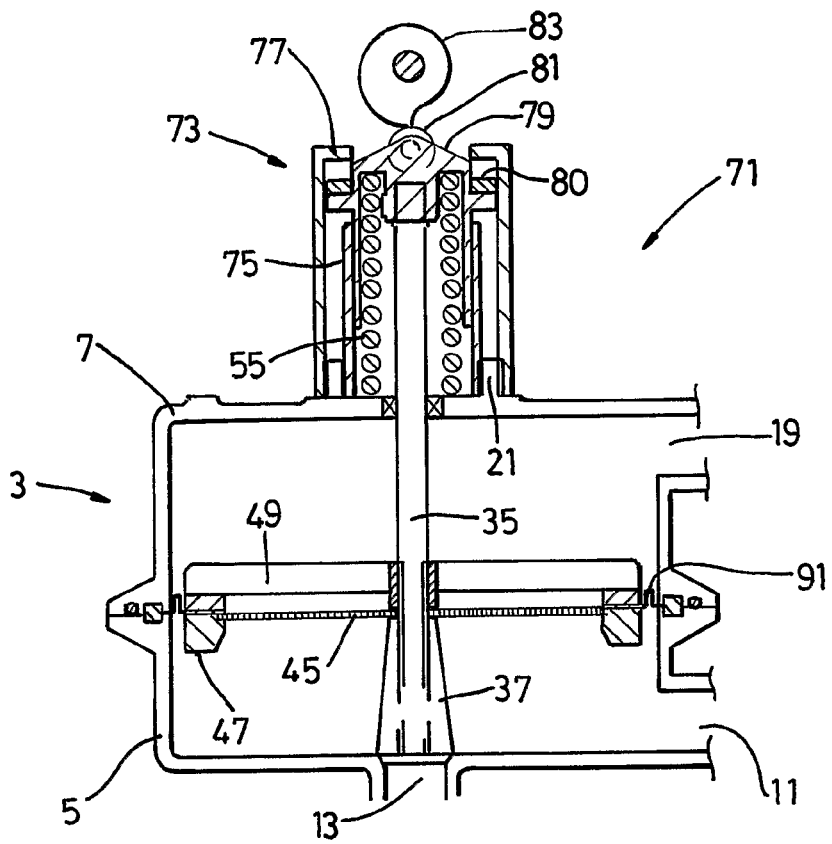
FIG. 6 is a sectional side view of a further modified filter in accordance with the present invention showing the filter in a rest condition.

Referring additionally to FIGS. 4 to 6, a modified filter 61 is shown with like features being given like references.

Filter 61 additionally comprises an anti-corrosion means comprising a disc 63 made from, or coated with, zinc. The disc 63 is mounted on the body 27 of the hub 25 above the spring 55. The periphery of the zinc disc 63 is provided with a suitable seal 64 that seals against the inside of the housing 3. The seal 64 may comprise an O-ring type seal. The disc 63 may be secured to the body 27 of the hub 25 in any suitable way including, for example, by screwing the zinc disc 63 onto threads formed on the body 27.

The zinc disc 63 thus separates the downstream chamber of the upper filter half 7 into two sub chambers. These sub chambers are linked by an inlet aperture 65 formed in the zinc plate 63.

Impellor means comprising four equispaced paddles 67 are secured to a ring 68 rotatably mounted on the body 27 of the hub 25 above the zinc disc 63 in the upper sub chamber. The paddles 67 rotate under influence of the fluid entering the upper sub chamber through the inlet aperture 65. Each paddle 67 is provided with an anti oxidation rod 69 that extends from top to bottom of the respective paddle 67. Any suitable number of paddles 67 and corresponding rods 69 can be provided.

In use the filtered fluid flows through the inlet aperture 65, into the upper sub chamber and into contact with the paddles 67 which rotate under influence of the filtered fluid such that the filtered fluid is swept over the zinc disc 63 and out through the tubular filter outlet 19. As the filtered fluid is swept over the zinc disc, particles of zinc are released into the filtered fluid. The zinc particles can assist in reducing corrosion of other components downstream of the filter 1.

The rods 69 are slidably mounted in bores 71 in respective paddles 67 and are under the influence of gravity such that the lower end of each rod 69 is in contact with the upper surface of the zinc disc 63. As the paddles 67 and rods 69 rotate, the lower surface of the rods 69 serves to abrade oxidisation that may have formed on the upper surface of the zinc disc 63 thus maximising the release of zinc particles into the filtered fluid.

The zinc disc 63 could be made from any other suitable material, such as magnesium for example, that releases anti corrosive particles into the filtered fluid. The rods 69 could also be made of any suitable material including, for example, brass, stainless steel or a ceramic material.

The zinc disc 63 and paddles 67 thus serve to reduce the corrosive effects of any corrosive fluid that is being filtered.

The modified filter 61 also includes a shaft guide 73 that extends from the underside of the drain plug 37 into the drain aperture 13 so as to radially constrain the lower end of the shaft 35.

The solenoid 43 described above acts to pull the shaft 35 upwardly. However the filter 1 could be modified such the solenoid 43 is repositioned so as to push the shaft 35.

The solenoid 43 could be replaced with any other suitable actuation means operative to apply a pulse to the shaft 35 such as, for example, an electric motor such as a DC stepping motor, or a hydraulic or pneumatically operated piston. A rotating solenoid could be provided. A suitable gear mechanism can be provided if required.

Figure 7:
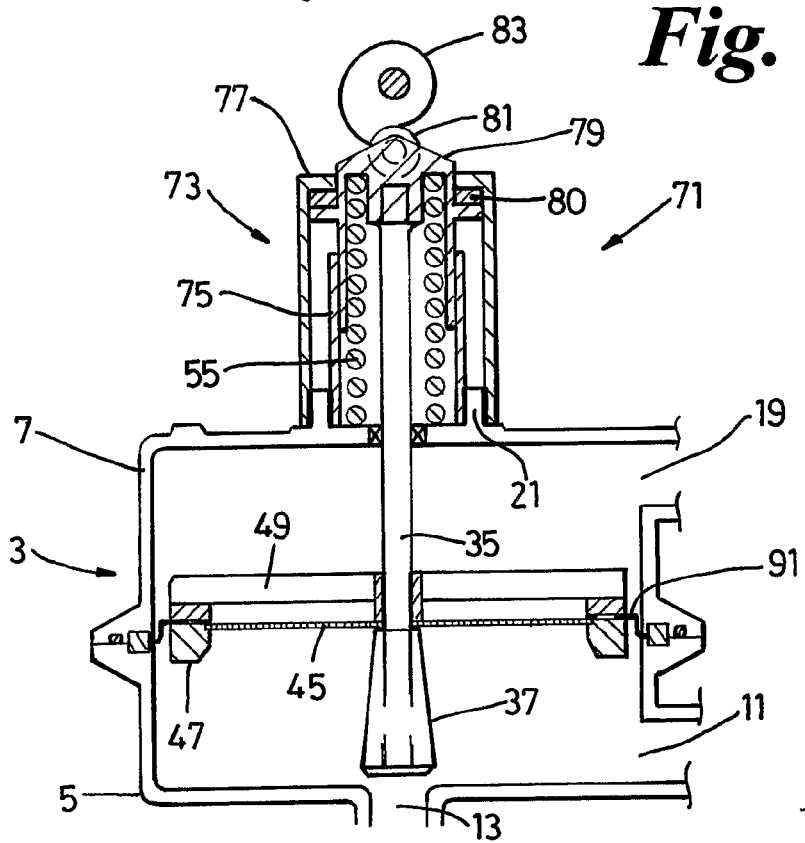
FIG. 7 is a view corresponding to FIG. 6 but showing the filter in another condition.

Referring to FIGS. 6 and 7 a modified filter 71 is shown comprising an alternative actuating mechanism. Like features have been given like references.

In this embodiment the filter 71 comprises an actuator assembly 73 that is mounted on top of the upper housing half 7 externally of the filter cavity.

The actuator assembly 73 comprises an inner tubular guide sleeve 75 the base of which threadingly engages the inside of the boss 21. An outer tubular actuator casing 77 surrounds the sleeve 75 with the lower portion of the casing 77 threadingly engaging the outside of the boss 21.

The upper end of the shaft 35 extends up through the sleeve 75 and is mounted to a movable spring locator 79 that can slide axially upwardly and downwardly along the guide sleeve 75 inside the housing 77. The coil spring 55 extends between the top of the housing half 7 and the underside of the spring locator 79. The upper surface of the spring locator 79 comprises a rubber end stop 80 that can engage the underside of the housing 77 and thus limits the maximum upward movement of the spring locator 79 and shaft 35.

The top of the spring locator 79 is provided with a cam follower 81 which in this example comprises a rotatably mounted wheel.

A cam 83 is mounted above the cam follower 81 and has a comma shaped profile, that is the diameter is constant for approximately 180°, increases for approximately 170° and then reduces suddenly for approximately 10°.

The cam 83 can be manually rotatable using a suitable hand crank for example (not shown) or could be electrically rotatable using a suitable electric motor (not shown).

The cam 83 rests in the position shown in FIG. 6 wherein the largest diameter portion of the cam 83 rests on the follower 81 which forces the spring locator 79, shaft 35, and plug 37 downwardly so that the plug 37 seals the drain aperture 13. When in this condition the filter 71 functions as described above with reference to filters 1 and 61.

When the filter 71 is to be cleaned, the cam 83 is rotated clockwise such that the narrowing diameter portion of the cam 83 is rotated into engagement with the cam follower 81. Because the diameter changes over a relative short rotational distance the follower 81 snaps upwardly under the influence of the spring 55. This causes the filter 45 to snap upwardly and causes the plug 37 to open the drain aperture 13 so that the cleaning cycle described above can occur.

An additional modification shown in the filter 71 of FIGS. 6 and 7 is the modified filter seal 91 wherein the energising o-ring 53 and PTFE outer sealing strip 54 are replaced by a flexible seal 91 that extends between, and is secured to, the housing 3 and the filter 45. The seal 91 thus comprises the gasket that seals between the lower and upper housing halves 5, 7.

The flexible seal 91 has sufficient length that the seal 91 comprises a fold in the space between the filter 45 and the housing 3 when the filter 71 is in the rest position shown in FIG. 6.

When the filter 71 is undergoing the cleaning cycle shown in FIG. 7 the filter 45 has moved upwardly and this causes the fold in the flexible seal 91 to unfold to some extent to account for this difference in position.

The actuation means could be operated to apply the pulse to the shaft 35 via a control signal from a timer, or by a fluid pressure switch operate to send a control signal when the fluid pressure in the downstream chamber of the filter 1 falls below a predetermined level, or by a control signal from a manually operated device such as a push button switch.

Various seals are provided between the moving and static components of the above described filters 1 and 61. These seals could be any suitable seals such as O-ring type seals, or rubber or fibre gaskets for example.

The peripheral seal between the reinforcing ring 47 and the wall of the housing 3 preferably comprises an inner O-ring 53 that pushes against an outer PTFE sealing strip 55. However an O-ring alone may suffice.

In a modification of the described filters, a gasket could be provided between the upper and lower housing halves 5, 7, the gasket extending into the housing 3 and into sealing contact with the reinforcing ring 47 of the filter disc 45.

The housing 3 and filter disc 45 are described as being of circular cross section. However any other desired shape of cross section can alternatively be used.

The filter disc could be formed from any suitable material or combination of materials including, for example, a sintered metal material. The filter disc could comprise a laminate of filter elements of different pore size.

The shape of the housing 3 can be varied to suit the requirements of the filter 1. For example, the base of the lower filter half 5 can be tapered.

It will be appreciated that the various features described above with reference to filters 1, 61 and 71 are interchangeable between filters 1, 61 and 71.

The invention claimed is:

1. A fluid filter comprising a housing provided with a fluid inlet and a fluid outlet, filter means being mounted in the housing between the fluid inlet and the fluid outlet, the filter means comprising a plurality of filter pores to filter fluid flowing through the housing, actuation means being provided to move the filter means, in use, within the housing in a direction substantially parallel to the axis of at least one pore, that is in a direction substantially parallel with the direction of fluid flow through at least one pore to dislodge particles of filtered material from the filter means so as to clean the pores of the filter means, wherein the housing includes a drain aperture on an upstream side of the filter means, and wherein the fluid filter further includes plug means coupled to the actuation means for selectively sealing the drain aperture, wherein the actuation means is configured to move the plug means relative to the drain aperture when the filter means is moved.

2. The fluid filter of claim 1 wherein the movement of the filter means comprises an axial movement in one direction and then in an opposed direction.

3. The fluid filter of claim 2 wherein the movement in at least one direction is an abrupt movement operative that moves the filter means relatively quickly over a relatively short distance to jolt the filtered particles from the blocked pores of the filter means.

4. The fluid filter of claim 2 wherein the filter means is moved initially towards the filter outlet.

5. The fluid filter of claim 1 wherein the actuation means exerts a pulse of force on the filter means to move the filter means.

6. The fluid filter of claim 1 wherein the actuation means comprises an electrically operated actuator.

7. The fluid filter of claim 6 wherein the actuator comprises a solenoid.

8. The fluid filter of claim 1 wherein the filter means is biased to a rest position, the actuation means, in use, moving the filter means away from the rest position against the action of the bias.

9. The fluid filter of claim 1 wherein the plug means is moved away from the drain aperture when the filter means is moved.

10. The fluid filter of claim 1 being operative such that as fluid enters the upstream part of the fluid filter through the fluid inlet, the filter means is moved to dislodge filtered material from the filter means into the upstream part of the fluid filter, further incoming fluid from the fluid inlet forcing the dislodged filtered material out of the upstream part of the fluid filter and through the open drain aperture.

11. The fluid filter of claim 10 wherein the actuation means is operative to simultaneously move the filter means and the plug means.

12. The fluid filter of claim 1 wherein the filter means comprises a planar filter disc.

13. The fluid filter of claim 12 wherein the filter disc is provided with peripheral sealing means which form a fluid seal between the interior of the housing and the periphery of the filter means.

14. The fluid filter of claim 12 wherein reinforcing means are provided to reinforce the filter disc to resist deformation of the filter disc in use.

15. The fluid filter of claim 14 wherein the reinforcing means comprises at least one reinforcing brace mounted across at least part of the filter disc.

16. The fluid filter of claim 1 wherein the filter means is mounted on a shaft which extends from the actuation means into the housing.

17. The fluid filter of claim 1 wherein the filter further comprises means to release anti-corrosive material into the filtered fluid.

18. The fluid filter of claim 17 wherein the means to release anti-corrosive material comprises a source of anti-corrosive material mounted in the outlet path of the filtered fluid.

19. The fluid filter of claim 18 wherein the means to release anti-corrosive material comprises a plate of an anti-corrosive metal material arranged such that the filtered fluid contacts the plate prior to flowing through the fluid outlet.

20. The fluid filter of claim 17 wherein impeller means is provided to direct the filtered fluid into contact with the anti-corrosive means.

21. The fluid filter of claim 17 wherein means are provided to remove oxidation formed on the anti-corrosive means.

22. The fluid filter of claim 21 wherein the oxidation removal means comprises abrasion means operative to contact the anti-corrosive means and abrade oxidation from the anti-corrosive means.

23. The fluid filter of claim 20 wherein an oxidation removal means is mounted to the impeller means for rotation with the impeller means.

24. A filter assembly comprising:
a first fluid filter including
   a housing provided with a fluid inlet, a fluid outlet, and a drain aperture,
   filter means being mounted in the housing between the fluid inlet and the fluid outlet, the filter means comprising a plurality of filter pores to filter fluid flowing through the housing, the drain aperture being positioned in the housing on an upstream side of the filter means,
   actuation means being provided to move the filter means, in use, within the housing in a direction substantially parallel to the axis of at least one pore, that is in a direction substantially parallel with the direction of fluid flow through at least one pore to dislodge particles of filtered material from the filter means so as to clean the pores of the filter means, and
   plug means coupled to the actuation means for selectively sealing the drain aperture, the actuation means configured to move the plug means relative to the drain aperture when the filter means is moved; and
a second fluid filter substantially identical to the first fluid filter, wherein the second fluid filter is connected to the first fluid filter.

25. The filter assembly of claim 24 wherein the first and second fluid filters are connected in series such that fluid flows through the first fluid filter before flowing through the second fluid filter.

26. The filter assembly of claim 25 wherein the filter means of the second fluid filter is adapted to filter finer material than the filter means of the first fluid filter.

27. The filter assembly of claim 24 wherein the first and second fluid filters are connected in parallel such that fluid simultaneously enters the fluid inlets of the respective first and second fluid filters and simultaneously exits the fluid outlets of the respective first and second fluid filters.

28. A fluid filter comprising a housing provided with a fluid inlet and a fluid outlet, filter means being mounted in the housing between the fluid inlet and the fluid outlet to filter fluid flowing through the housing, the filter further comprising means to release anti-corrosive material into the filtered fluid, wherein means are provided to remove oxidation formed on the anti-corrosive means, and wherein the oxidation removal means comprises abrasion means operative to contact the anti-corrosive means, and abrade oxidation from the anti-corrosive means.

29. The fluid filter of claim 28 wherein the means to release anti-corrosive material comprises a source of anti-corrosive material mounted in the outlet path of the filtered fluid.

30. The fluid filter of claim 29 wherein the means to release anti-corrosive material comprises a plate of an anti-corrosive metal material arranged such that the filtered fluid contacts the plate prior to flowing through the fluid outlet.

31. The fluid filter of claim 28 wherein impeller means is provided to direct the filtered fluid into contact with the anti-corrosive means.

32. A fluid filter comprising a housing provided with a fluid inlet and a fluid outlet, filter means being mounted in the housing between the fluid inlet and the fluid outlet to filter fluid flowing through the housing, the filter further comprising means to release anti-corrosive material into the filtered fluid, wherein impeller means is provided to direct the filtered fluid into contact with the anti-corrosive means, and wherein an oxidation removal means is mounted to the impeller means for rotation with the impeller means.

* * * * *